(12) United States Patent
Chen et al.

(10) Patent No.: US 7,178,942 B2
(45) Date of Patent: Feb. 20, 2007

(54) PLANAR LIGHT-EMITTING DEVICE

(75) Inventors: Yi-Ming Chen, Hsin-Chu (TW);
Jun-Chung Chen, Hsin-Chu (TW);
Chou-Chih Yin, Hsin-Chu (TW);
Chia-Liang Hsu, Hsin-Chu (TW);
Chia-Fen Tsai, Hsin-Chu (TW);
Min-Hsun Hsieh, Hsin-Chu (TW)

(73) Assignee: Epistar Corporation, Hsinchu (TW)

( * ) Notice: Subject to any disclaimer, the term of this patent is extended or adjusted under 35 U.S.C. 154(b) by 100 days.

(21) Appl. No.: 10/905,732

(22) Filed: Jan. 19, 2005

(65) Prior Publication Data

US 2005/0265044 A1 Dec. 1, 2005

(30) Foreign Application Priority Data

May 28, 2004 (TW) .............................. 93115435 A

(51) Int. Cl.
*F21V 9/00* (2006.01)
(52) U.S. Cl. ...................... 362/231; 362/247; 362/613

(58) Field of Classification Search ................ 362/231, 362/235, 247, 613, 551, 554, 615
See application file for complete search history.

(56) References Cited

U.S. PATENT DOCUMENTS

| 5,664,862 | A  | * | 9/1997 | Redmond et al. ........... 362/625 |
| 6,540,377 | B1 | * | 4/2003 | Ota et al. .................... 362/231 |
| 6,608,332 | B2 | * | 8/2003 | Shimizu et al. ............... 257/98 |
| 7,052,168 | B2 | * | 5/2006 | Epstein et al. .............. 362/625 |

FOREIGN PATENT DOCUMENTS

| JP | 2003-255345 | 9/2003 |
| TW | 200400648   | 1/2004 |
| TW | 200401870   | 2/2004 |

* cited by examiner

*Primary Examiner*—Ali Alavi
(74) *Attorney, Agent, or Firm*—Winston Hsu

(57) ABSTRACT

A planar light-emitting device includes a light source for generating light, a light gathering module for gathering the light generated by the light source and generating mixed light, a linear light generator comprising a light distributing unit for receiving the mixed light and distributing the mixed light to generate linear light, and a planar light generator for receiving the linear light and generating a planar light.

17 Claims, 6 Drawing Sheets

PLANAR LIGHT-EMITTING DEVICE

BACKGROUND OF INVENTION

1. Field of the Invention

The present invention relates to a planar light-emitting device, and more particularly, to a planar light-emitting device for gathering and mixing light to generate planar light.

2. Description of the Prior Art

A planar display such as a liquid crystal display (LCD) is a passive display, i.e., it requires a device functioned as a light source, to provide a planar or linear light, and this device is usually called a backlight module. There are usually two types of backlight modules, one is the direct type backlight, and the other is the edge light type backlight.

FIG. 1 illustrates a conventional direct type backlight module 101. The direct type backlight module 101 includes a set of light sources 11, a liquid crystal display panel (not shown), which being placed above the direct type backlight module 101, and an optical conditioning component 12, such as a diffuser and/or a prism sheet etc. The light sources 11, such as cold cathode fluorescent lamps (CCFLs), organic light emitting diode (OLED) or/and light emitting diodes (LEDs), are installed behind the liquid crystal display panel. The optical conditioning component 12 functions to direct and uniformly spread the light emitted by the light sources 11 into the liquid crystal display panel. The light sources 11 usually have to be spaced and arranged deliberately for uniformly distributing the light into the panel in order to avoid the occurrence of bright area 13 and dark area 14 as shown in FIG. 1.

FIG. 2 illustrates a conventional edge type backlight module 102. The edge type backlight module 102 includes at least a set of light sources 112, a liquid crystal display panel (not shown), an optical conditioning component 122, and a light guide plate (LGP) 152. In the edge type backlight module 102, the light sources 112 are installed on at least one edge of the light guide plate 152. The optical conditioning component 122 and the light guide plate 152 are for directing and uniformly spreading the light emitted from the light sources 112 into the liquid crystal display panel. Additionally, the light sources 112 may be CCFLs, OLED or/and LEDs, and the optical conditioning component 122 may be a diffuser and/or a prism sheet. The bigger the size of the liquid crystal display panel becomes, however, the more the numbers of light sources 112 are accordingly required, and the light sources 112 are necessarily installed on more edges of the light guide plate 152.

However, no matter which type of the backlight module is adopted, most of the light generated by the light sources 11/112 directly enters into the optical conditioning component 12/122 and/or the LCD panel. Whenever any variation of the light sources happens, such as blinking, failure, fading etc., the backlight module becomes unstable in brightness, and color shift phenomenon may occur.

SUMMARY OF THE INVENTION

It is therefore an objective of the present invention to provide a planar light-emitting device with a uniform lighting performance even though the variation of light sources happens.

The planar light-emitting device according to present invention includes a light source for generating light, a light gathering module for receiving the light and generating mixed light, a linear light generator with a light distributing unit, wherein the linear light generator is capable of receiving and distributing the mixed light to linear light, and a planar light generator for receiving the linear light and generating planar light.

These and other objectives of the present invention will no doubt become obvious to those of ordinary skill in the art after reading the following detailed description of the preferred embodiments that are illustrated in the various figures and drawings.

DETAILED DESCRIPTION

Figure 1:
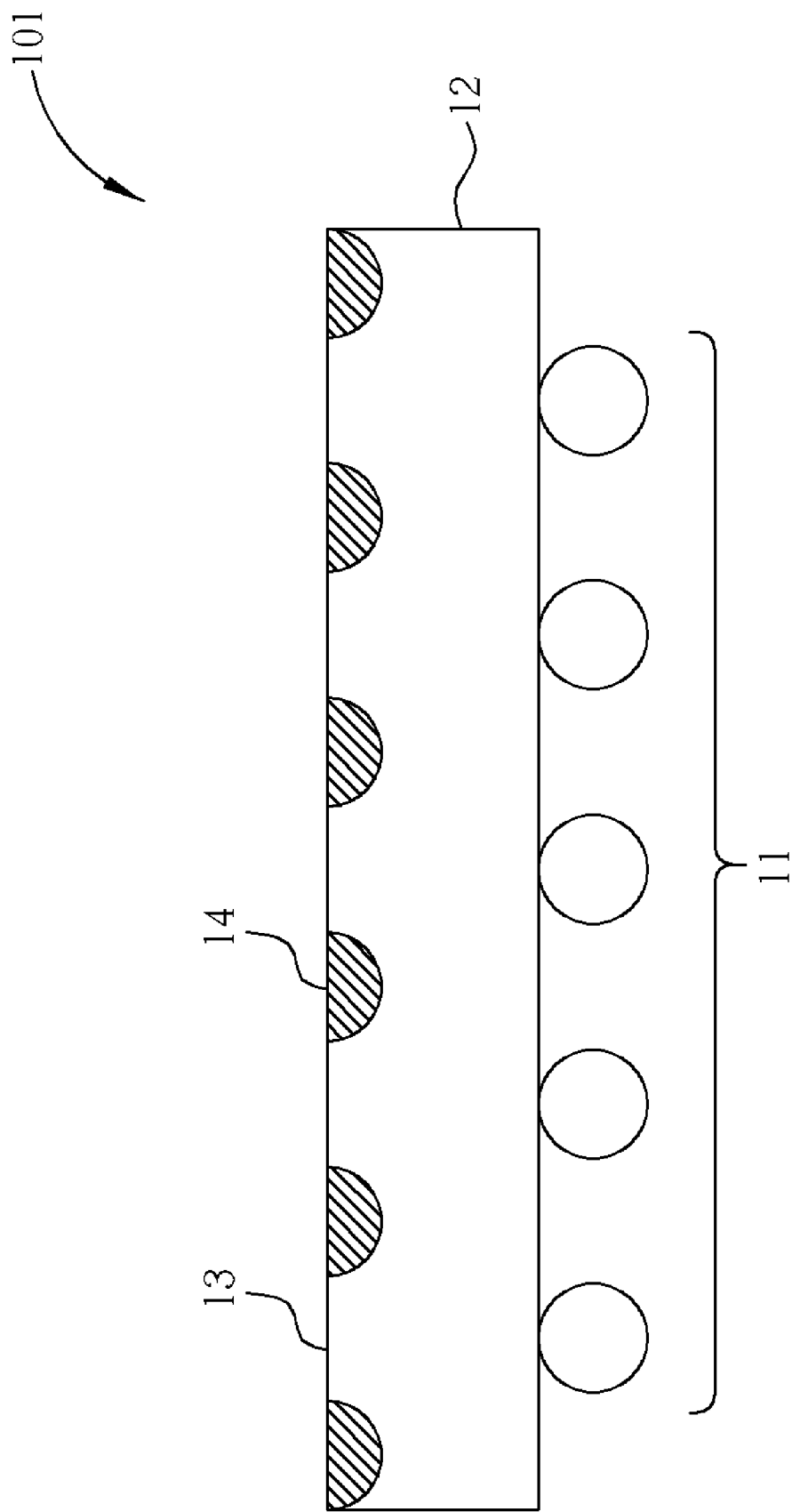
FIG. 1 is a drawing illustrating a conventional direct type backlight module.
Figure 2:
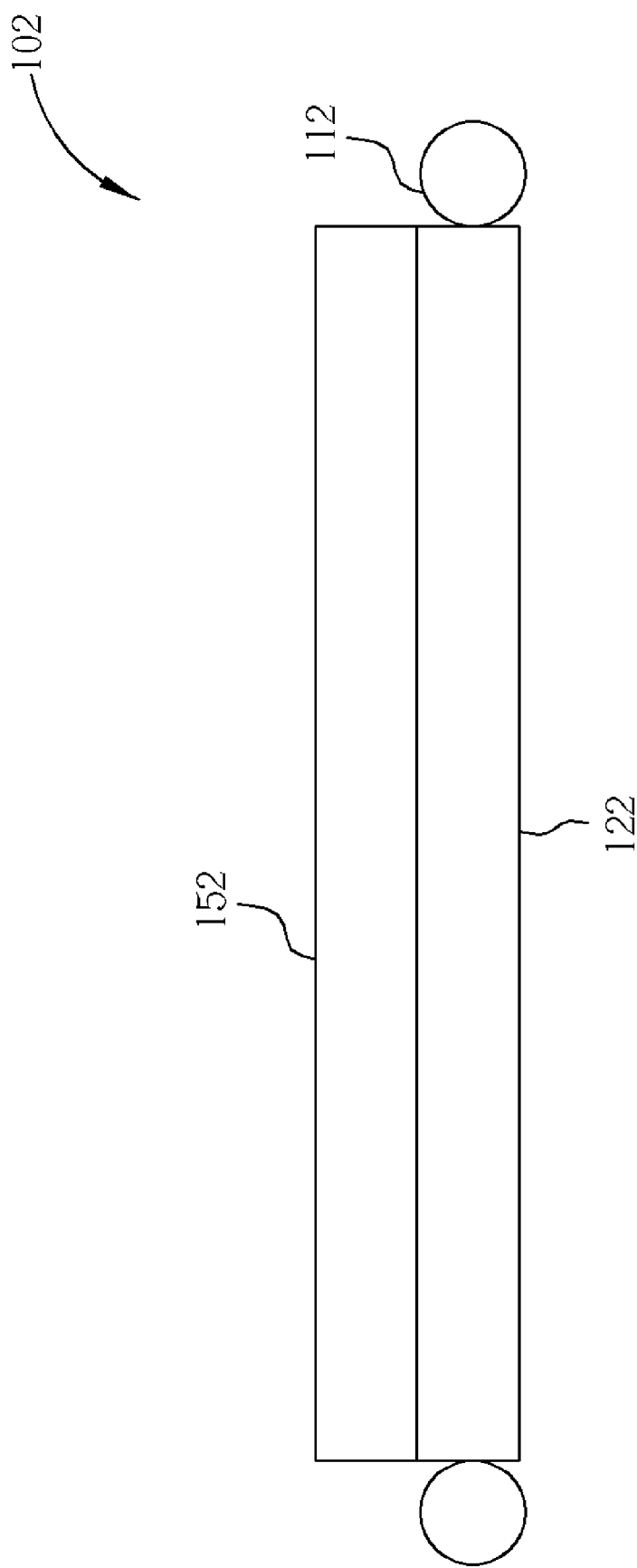
FIG. 2 is a drawing illustrating a conventional edge type backlight module.
Figure 3:
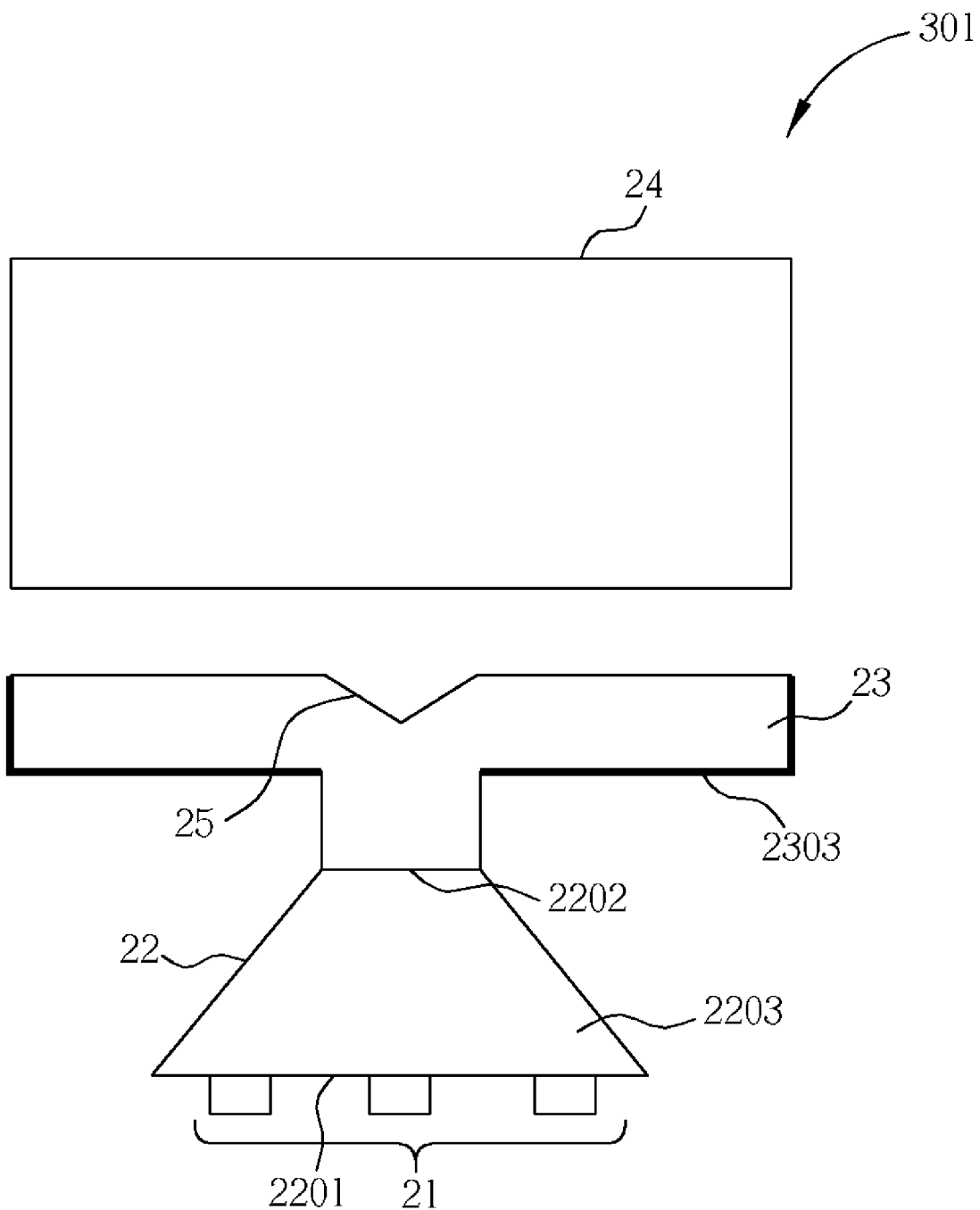
FIG. 3 is a drawing illustrating a planar light-emitting device according to one embodiment of the present invention.
Figure 4:
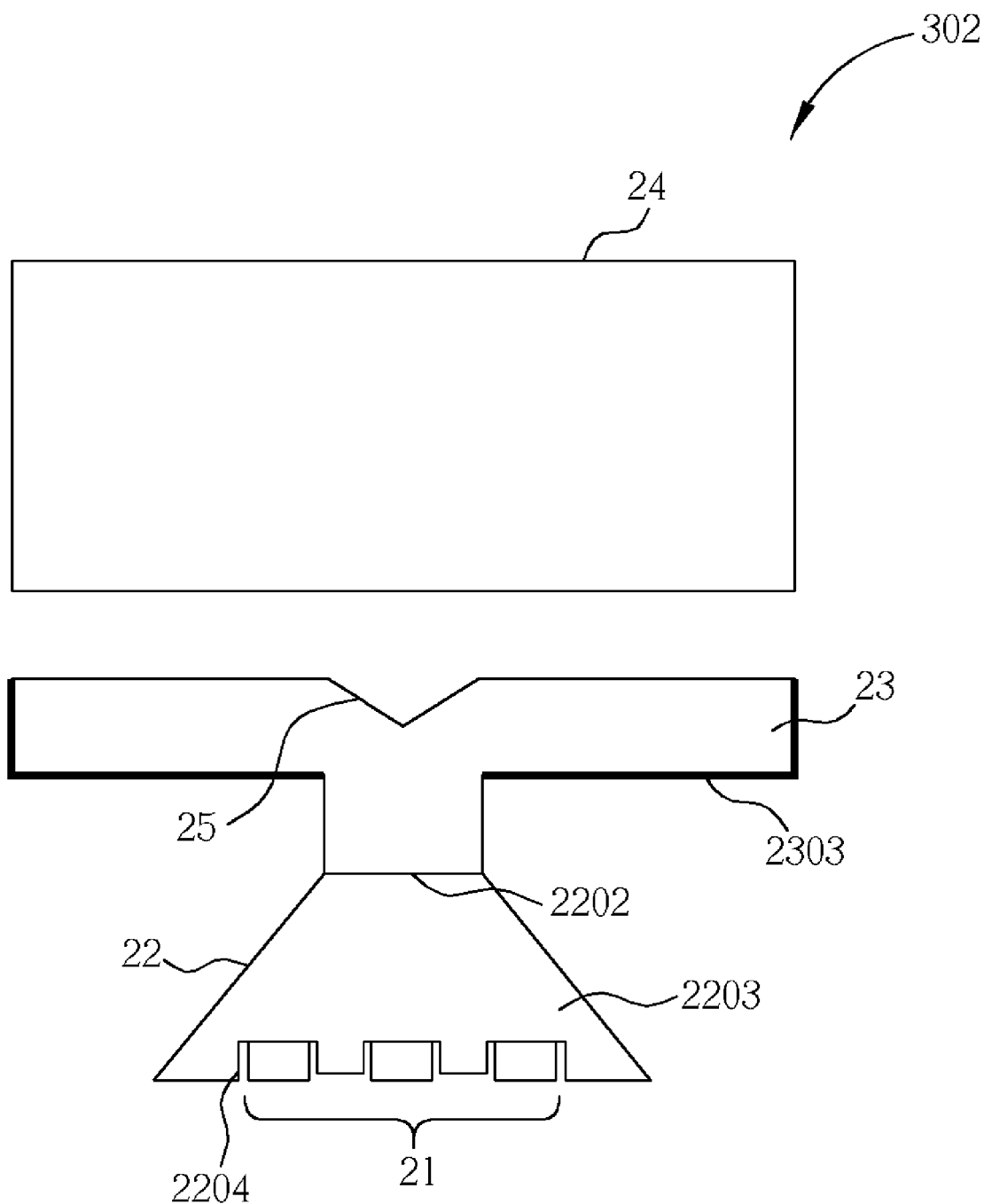
FIG. 4 is a drawing illustrating a planar light-emitting device according to another embodiment of the present invention.

Please refer to FIG. 3 and FIG. 4. FIG. 3 is a drawing illustrating a planar light-emitting device 301 according to one embodiment of the present invention, and FIG. 4 is a drawing illustrating a planar light-emitting device 302 according to another embodiment of the present invention. The planar light-emitting device 301 comprises light sources 21 and a light gathering module 22 capable of gathering the light generated by the light sources 21. The light emitted by the light sources 21 becomes mixed through the light gathering module 22. A linear light generator 23 receives the mixed light from the light gathering module 22, and a light distributing unit 25 of the linear light generator 23 is capable of transferring most of the mixed light into linear light (not shown). A planar light generator 24 is capable of receiving the linear light from the linear light generator 23 and distributing the linear light into planar light (not shown) which can be used for a planar display or for illumination accordingly. The liner light generator 23 is disposed under the planar light generator 24 or by any one edge of the planar light generator 24.

The light sources 21 can be any kind of light sources, such as cold cathode fluorescent lamps, light emitting diodes (LED), fluorescent lamps, incandescent lamps, or halogen lamps. For generating white light, the light sources 21 may adopt white LEDs, a combination of red, blue and green LEDs, or other combinations of LEDs that are capable of generating white light. When LEDs of different colors are adopted in the light sources 21, the LEDs of different colors may be placed on the light gathering module 22 in a pre-designed, periodical, or group type for providing white light uniformly.

The light gathering module 22 is to gather the light generated by the light sources 21, mix the light well and then generate mixed light. For instance, the light gathering module 22 may gather and mix the red, blue and green lights emitted from the light sources 21, mix these three colorlights, and then generate white light consequently. Light emitted from the light sources 21 is mixed in the light gathering module 22 firstly. Therefore, the light received by the linear light generator 23 and the planar light generator 24 is substantially mixed. Even some of the light sources 21 have defects such as failure, fading, color shift, or blinking, the mixed light of the light gathering module 22 can avoid or reduce the ill effects of these problems. Hence the linear light generator 23 and the planar light generator 24 are more reliable, and the performance of the planar display is improved accordingly. Furthermore, a light detector (not shown) may be incorporated with planar light-emitting device to monitor the quality and/or quantity of the mixed light. When the quality and/or quantity of the mixed light decreases due to the variation of some of the light sources 21, the light detector can catch the variation, and the output of the other of the light sources 21 change accordingly in order to preserve a desired light quality and/or quantity.

The light gathering module 22 has an incident surface 2201 and a light-emitting surface 2202, the light sources 21 are placed on the side of the incident surface 2201 or on the incident surface 2201 as illustrated in FIG. 3, preferably, the light sources 21 are placed on an open space, such as cavities 2204, of the incident surface 2201 as illustrated in FIG. 4. The light gathering module 22 is shaped in cone, pyramid, or other tapered profile. In addition, the light sources 21 and the light gathering module 22 may be formed as a whole, or be connected by an adhesive, such as silicone, epoxy resin, BCB, etc., filling up the gap between the light sources 21 and the light gathering module 22 in order to decrease the loss occurred during the light transmission from air to the light gathering module 22. The cross-section of the light gathering module 22 may shrink from the incident surface 2201 to the light-emitting surface 2202 for guiding the light from the light sources 21 to the light-emitting surface 2202 and mixing accordingly. Furthermore, as illustrated in FIG. 3 and FIG. 4, a reflecting film 2203 is formed outside the light gathering module 22, except the area functioned as the incident surface 2201 and the light-emitting surface 2202, for reflecting the light generated by the light sources 21 or the mixed light. Hence, most light can be mixed well and directed to the light-emitting surface 2202. The reflecting film 2203 is a metal film, a mirror layer, or other light-reflecting material. Besides, in order to mix and guide the light generated by the light sources 21 to the light-emitting surface 2202, the incident surface 2201 can be a curved surface, such as a spherical surface, a parabolic surface or another curved surface that can focus or/and guide light.

As the light sources 21 are LEDs, the LEDs 21 can be installed in the cavities 2204 of the light gathering module 22 as illustrated in FIG. 4, and the inner surfaces of the cavities 2204 may be covered with fluorescent material (not shown), such as phosphor. The fluorescent material can absorb the light of the LEDs and generates light with desired hue. Therefore, the volume of the light sources 21 and the light gathering module 22 may be reduced effectively.

The material of the light gathering module 22 can be acrylic resin, cyclic olefin copolymer(COC), polymethyl methacrylate (PMMA), polyethylene terephthalate (PET), Polycarbonate (PC), polyetherimide, fluorocarbon polymer, silicone, combinations of the aforementioned materials, or other combinations of materials that are pervious to light. The light gathering module 22 may be a combination of optical components, such as a combination of lenses that can focus light.

Figure 5:
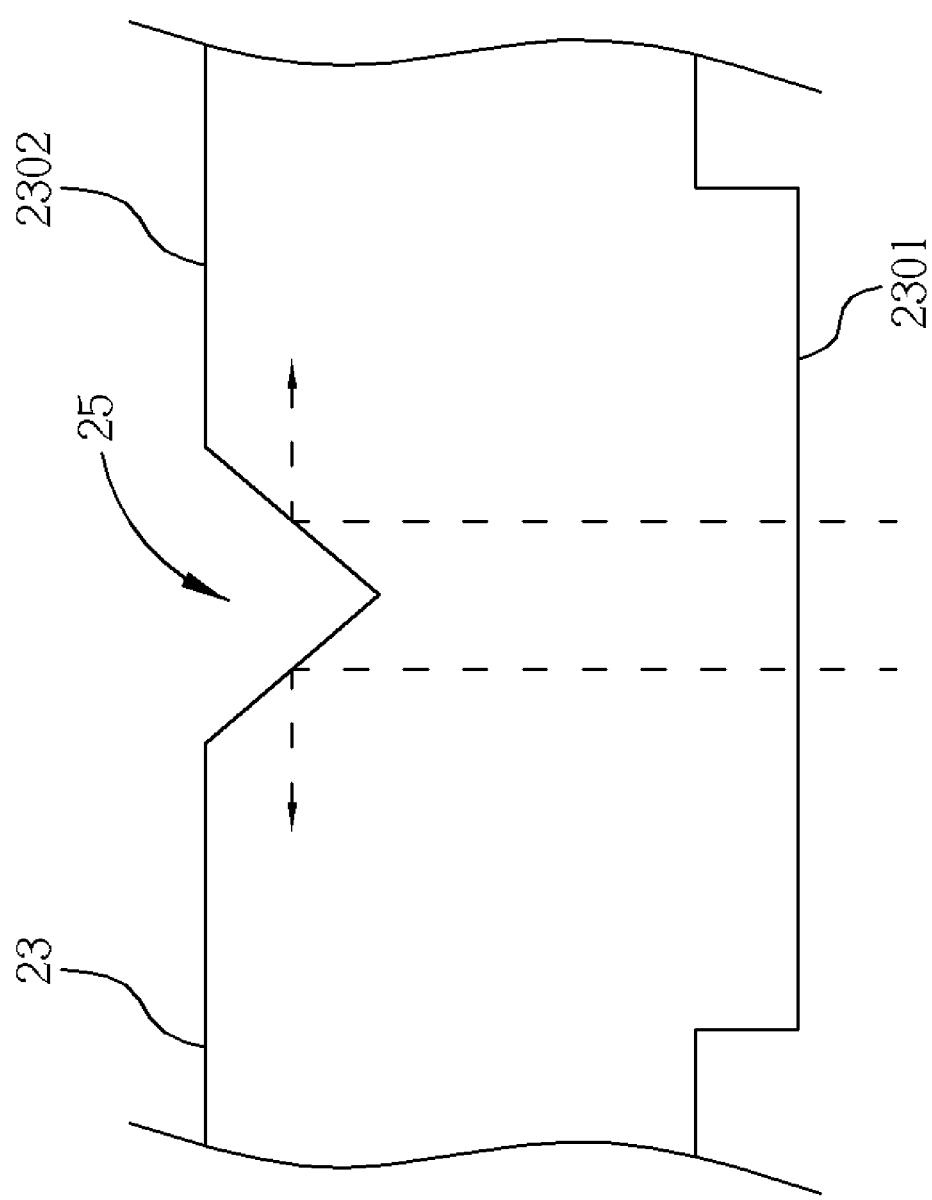
FIG. 5 is a partial view of a linear light generator according to one embodiment of the present invention.
Figure 6:
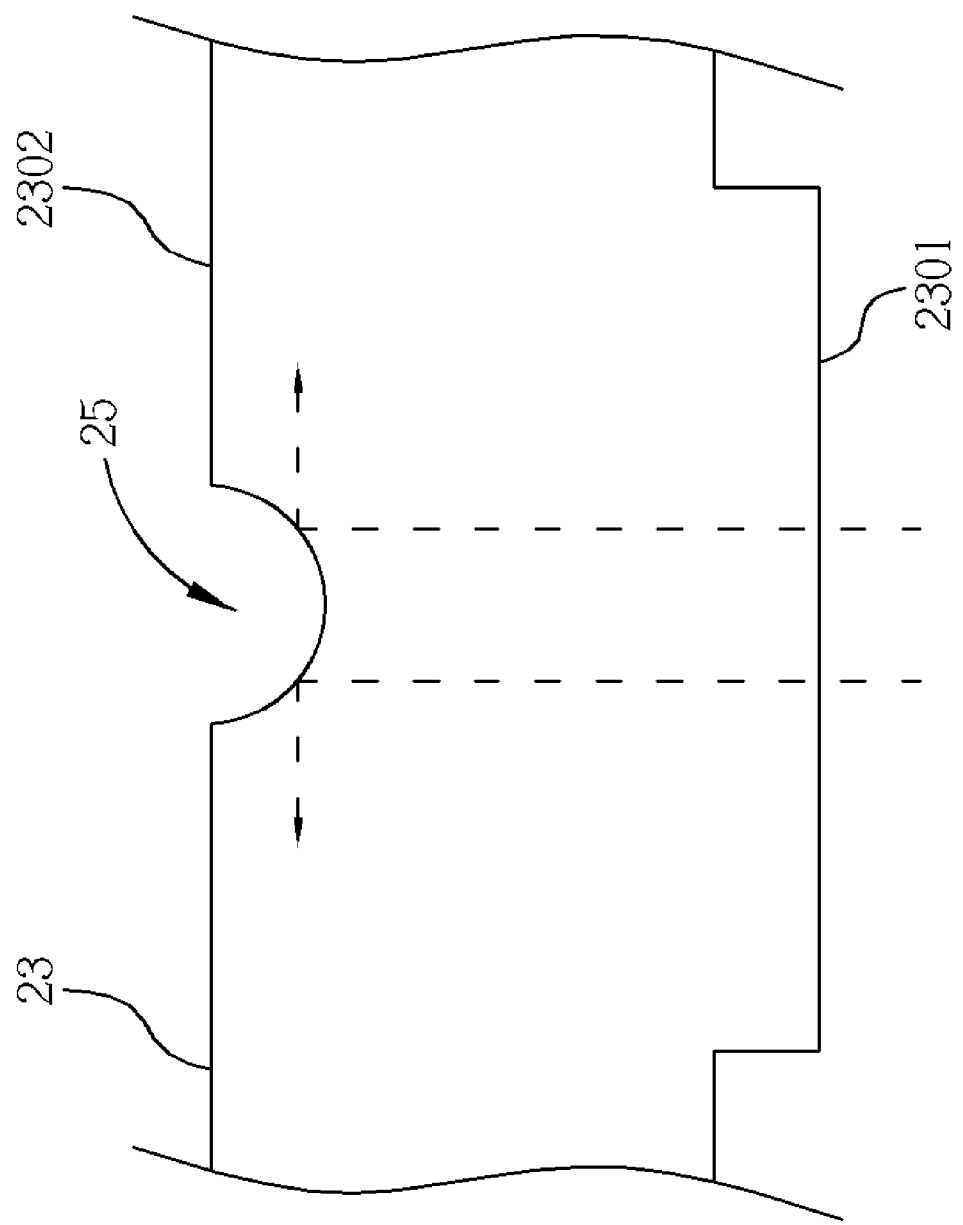
FIG. 6 is a partial view of a linear light generator according to another embodiment of the present invention.

Please refer to FIG. 5 and FIG. 6. FIG. 5 is a partial view of a linear light generator according to one embodiment of the present invention, and FIG. 6 is a partial view of a linear light generator according to one embodiment of the present invention. The linear light generator 23 receives the mixed light generated by the light gathering module 22, and distributes the mixed light by the light distributing unit 25. The linear light generator 23 has a first surface 2301 and a second surface 2302, as shown in FIG. 5 and FIG. 6. The light emitted from the light-emitting surface 2202 enters the first surface 2301. The light distributing unit 25 is arranged on the side of the second surface 2302. It is preferred to arrange the first surface 2301 and the second surface 2302 on opposite sides, or to arrange the light distributing unit 25 opposite to the first surface 2301. Therefore, the light gathered and mixed by the light gathering module 22 can enter directly to the light distributing unit 25. Besides, the second surface 2302 is disposed next to the planar light generator 24 for guiding the linear light towards the planar generator 24. However, the light distributing unit 25 may be disposed at other positions where the effect of light distributing can be achieved. In addition, for developing a total reflection when the light is incident into the light distributing unit 25, a refraction coefficient of the linear light generator 23 is different from that of the planar light generator 24, or an air gap (not shown) is between the linear light generator 23 and the planar light generator 24.

Please refer to FIG. 5 and FIG. 6 again. The light distributing unit 25 can be a cavity, and preferably the cavity 25 is V-shaped, U-shaped, wavy, other shapes that can guide light in a direction substantially perpendicular to the path that light enters into the linear light generator 23. When the light from the light gathering module 22 is incident on the light distributing unit 25 at a certain angle, total internal reflection is developed since the other side of the cavity has a refraction index greater than that of the linear light generator 23. It is assumed that the cavity is V-shaped and the angle of the V-shaped cavity is $\theta$, the critical angle of the material of the linear light generator 23 is $\theta c$, and a total internal reflection is developed when $\theta<2\times(90-\theta c)$. Similarly, when the cavity is U-shaped or wavy, the light can be uniformly distributed into the linear light generator 23 by the total internal reflection. In other words, the light is redirected towards the opposite directions inside the linear light generator 23 via the light distributing unit 25 and consequently a linear light is formed. Besides, a reflecting surface or a scattering surface (not shown in FIG. 5 and FIG. 6) can be formed inside the cavity for improving the performance of the light distribution. The reflecting surface can be a mirror surface, or the scattering surface can be a rough surface.

To improve the directionality and the uniformity of the linear light generated by the linear light generator 23, a reflecting surface 2303 is further formed on the outer surface of the linear light generator 23 for reflecting the light inside the linear light generator 23 towards the same direction, as illustrated in FIG. 3 and FIG. 4. The reflecting surface 2303 does not cover the outer surface of the linear light generator 23 where the light enters or exits the linear light generator 23. The material of the linear light generator 23 can be the same as that of the light gathering module 22 as mentioned above.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A planar light-emitting device comprising:
   a light source for generating light;
   a light gathering module for receiving the light and generating mixed light;

a linear light generator having a first surface for receiving the mixed light and a second surface on which a light distributing unit is disposed, the linear light generator generating linear light from the mixed light, and the light distributing unit redirecting at least part of the mixed light coming from the first surface; and a planar light generator for receiving the linear light and generating planar light.

2. The device of claim 1, wherein the light source is a point light source.

3. The device of claim 1, wherein the light gathering module comprises an incident surface for receiving the light and a light-emitting surface for emitting the mixed light.

4. The device of claim 3, wherein an area of the light-emitting surface is smaller than an area of the incident surface.

5. The device of claim 3, wherein the incident surface is flat.

6. The device of claim 3, wherein the light source is disposed on the incident surface.

7. The device of claim 3 wherein the incident surface comprises a cavity for receiving the light source.

8. The device of claim 1, wherein the first surface and the second surface are not coplanar.

9. The device of claim 1, wherein the light distributing unit is an indentation in the linear light generator.

10. The device of claim 9, wherein the cavity comprises a reflecting area for reflecting the mixed light.

11. The device of claim 10, wherein the reflecting area is a mirror.

12. The device of claim 9, wherein the cavity comprises a scattering area for scattering the mixed light.

13. The device of claim 12, wherein the scattering area is a rough surface.

14. The device of claim 1, wherein the light distributing unit is V-shaped, U-shaped, saw-toothed or wavy.

15. The device of claim 1, wherein the linear light generator further comprises a reflecting surface for reflecting the mixed light.

16. The device of claim 1, wherein the light source comprises a plurality of illuminators emitting light in different colors.

17. The device of claim 1, wherein a material of the light gathering module is selected from a group consisting of cyclic olefin copolymer (COC), polymethyl methacrylate (PMMA), polyethylene terephthalate (PET), Polycarbonate (PC), polyetherimide, fluorocarbon polymer, silicone, and combinations thereof.

* * * * *